US 6,552,293 B2

(12) United States Patent
Moro

(10) Patent No.: US 6,552,293 B2
(45) Date of Patent: Apr. 22, 2003

(54) METALLIC MEMBERS JOINING METHOD AND REFLOW SOLDERING METHOD

(75) Inventor: Kyoji Moro, Chiba-ken (JP)

(73) Assignee: Miyachi Technos Corporation, Chiba-ken (JP)

( * ) Notice: Subject to any disclaimer, the term of this patent is extended or adjusted under 35 U.S.C. 154(b) by 43 days.

(21) Appl. No.: 09/813,317

(22) Filed: Mar. 21, 2001

(65) Prior Publication Data

US 2001/0027962 A1 Oct. 11, 2001

(30) Foreign Application Priority Data

Mar. 22, 2000 (JP) ........................................ 2000-080239

(51) Int. Cl.[7] .............................................. B23K 3/047
(52) U.S. Cl. ................................ 219/85.22; 219/56.21; 219/56.22; 219/85.16
(58) Field of Search ................................. 219/110, 108, 219/117.1, 85.16, 85.19, 85.22, 56.21, 56.22

(56) References Cited

U.S. PATENT DOCUMENTS 4,804,810 A * 2/1989 Drummond et al. ..... 219/85.19
5,489,757 A * 2/1996 Schuermann et al. ........ 219/110
6,046,424 A * 4/2000 Jochi ........................... 219/110
6,137,077 A * 10/2000 Moro et al. .................. 219/110

* cited by examiner

*Primary Examiner*—Clifford C. Shaw

(57) ABSTRACT

In each odd-numbered unit current-supplying period of a plurality of unit current-supplying periods making up a set current-supplying time, a control unit subjects only positive switching elements to continuous switching operations at an inverter frequency while keeping negative switching elements in an OFF state, whereas in each even-numbered unit current-supplying period, the control unit subjects only the negative switching elements to continuous switching operations while keeping the positive switching elements in an OFF state. This allows a secondary current having a substantially trapezoidal current waveform to flow through a secondary circuit of a power supply apparatus in the positive direction in each odd-numbered unit current-supplying period but in the negative direction in each even-numbered unit current-supplying period. When a current-halting signal is received in the process of such a supply of current, the control unit brings the switching control of an inverter to a halt to interrupt the supply of current at once.

10 Claims, 13 Drawing Sheets

SQ : SQUEEZE TIME

WE : CURRENT-SUPPLYING TIME

HOLD : HOLD TIME

Is : CURRENT (PEAK VALUE)

Ts : ONE CYCLE OF SECONDARY AC FREQUENCY

Ts/2 : UNIT CURRENT-SUPPLYING TIME

FIG.4
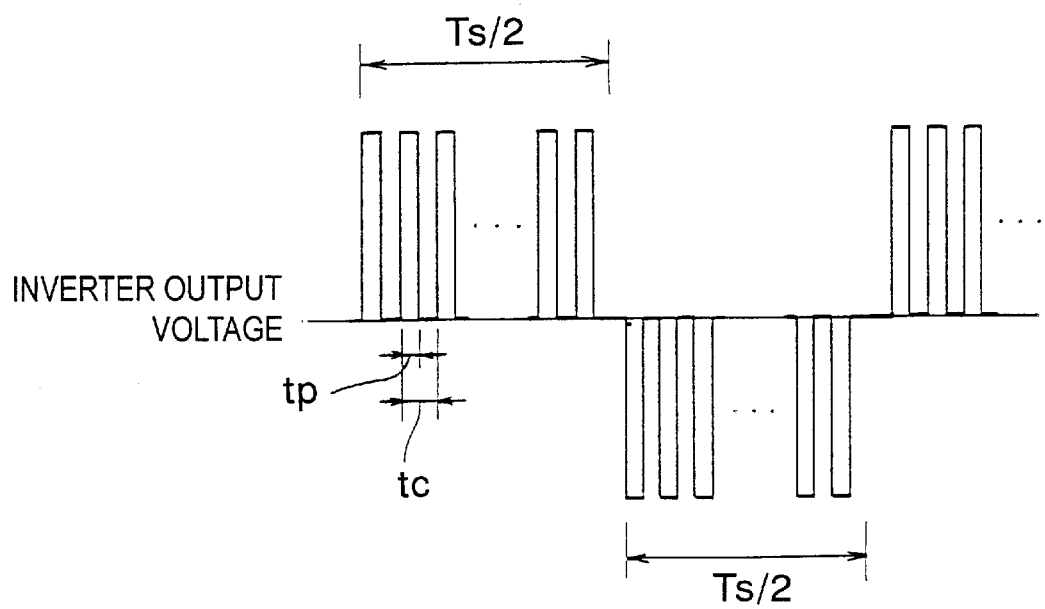
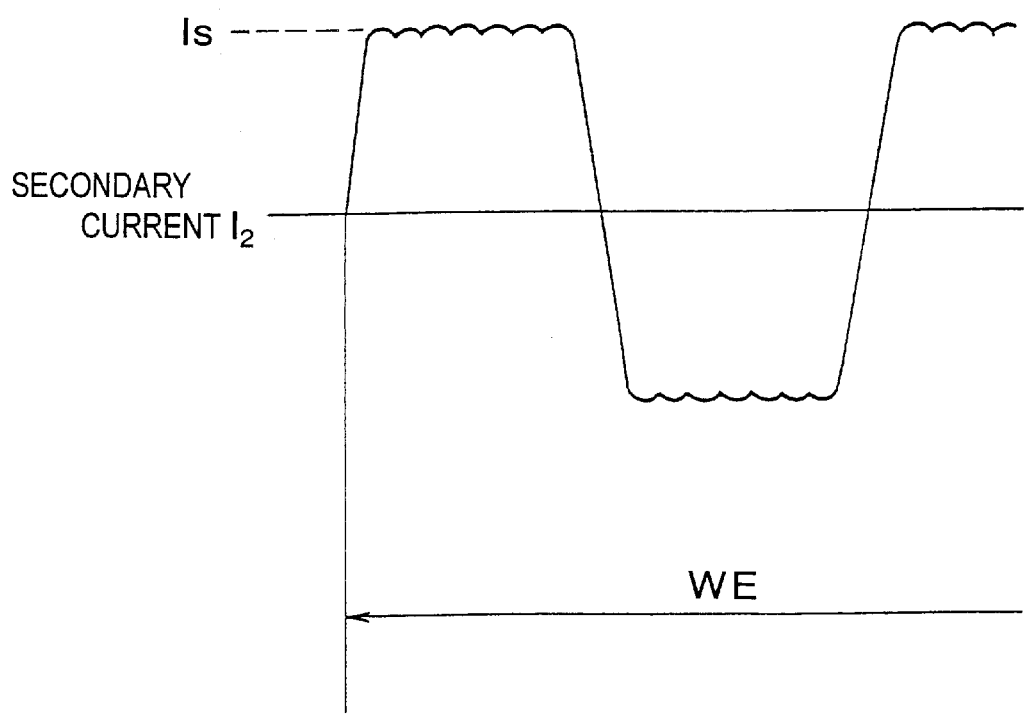

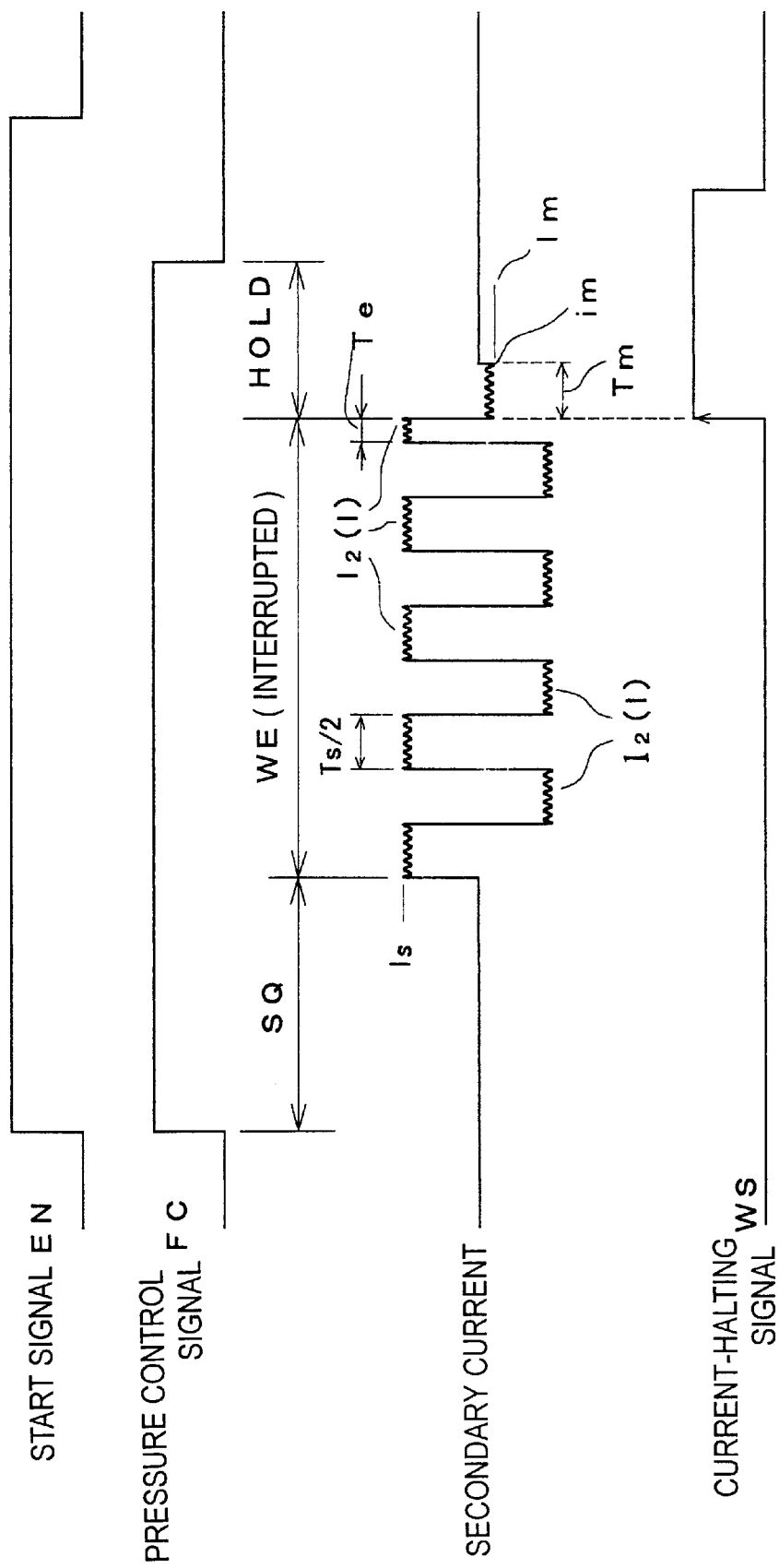

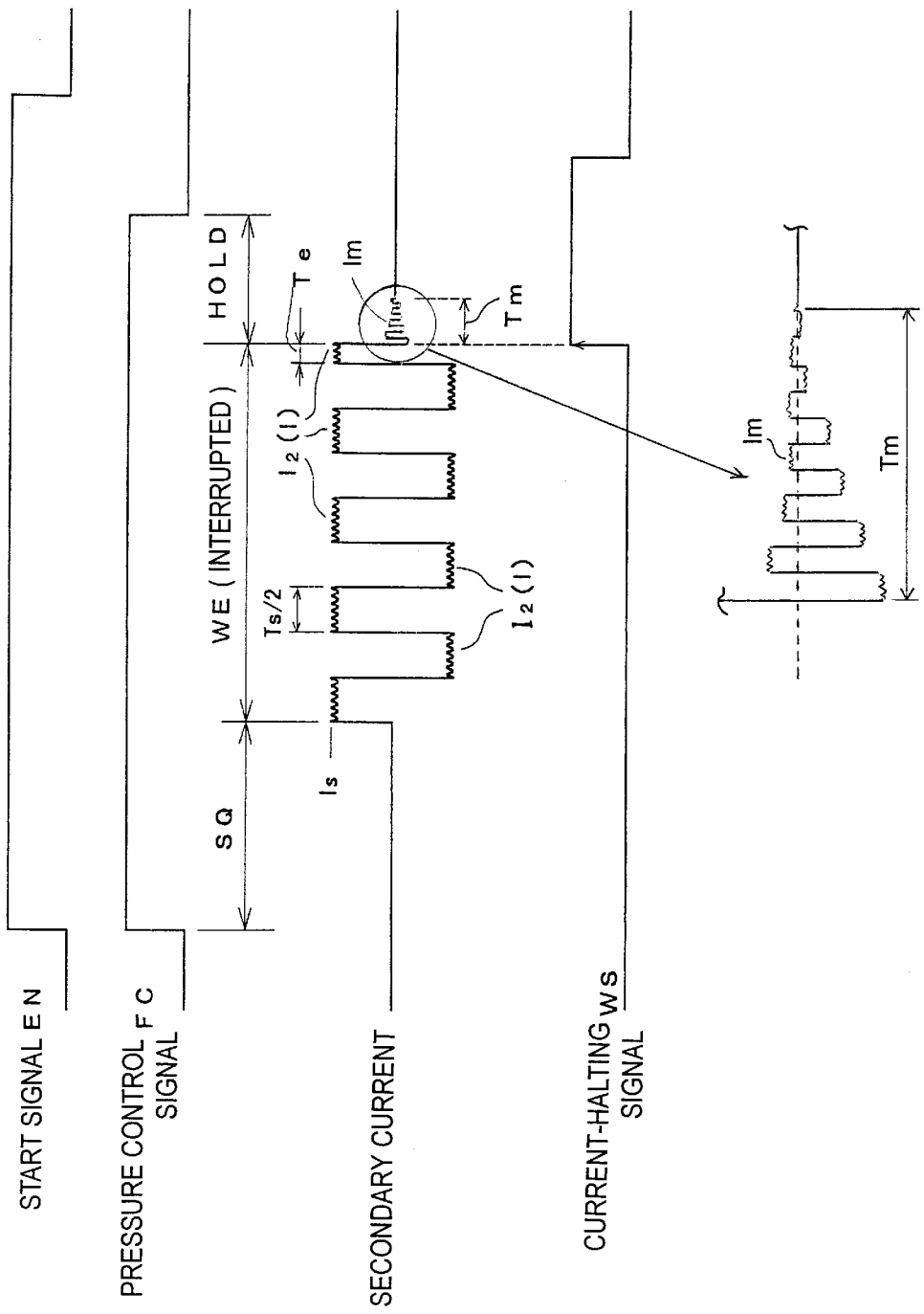

METALLIC MEMBERS JOINING METHOD AND REFLOW SOLDERING METHOD

BACKGROUND OF THE INVENTION

1. Field of the Invention

The present invention relates to a method of joining or reflow soldering metallic members by use of electric current having an AC waveform.

2. Description of the Related Arts

Reference is made to FIGS. 11A–11C depicting by way of example a fusing process which is one method of joining metallic members together. This process includes electrically and physically joining an insulated wire 2 and a terminal plate 4 made of copper or copper alloy.

First, as shown in FIG. 11A, workpieces W consist of the terminal 4 and the insulated wire 2 placed inside a hooked portion or a bent portion 4a of the terminal 4. The workpieces W are interposed between a pair of (e.g., upper and lower) electrodes 6 and 8 in such a manner that the lower electrode 8 provides a support for the underside of the terminal hooked portion 4a at a given position while simultaneously the upper electrode 6 is abutted against the top face of the terminal hooked portion 4a so that the top face is pressed down by a pressure device (not shown) with a predetermined pressing force F. At the same time, a predetermined voltage is applied across the two electrodes 6 and 8 by a power supply apparatus (not shown).

Then, first, an electric current I flows across the two electrodes 6 and 8 through the terminal hooked portion 4a acting as a current path, with the result that Joule heat is generated in the terminal hooked portion 4a. Consequently, as shown in FIG. 11B, an insulator 2a of the insulated wire 2 is melted by the Joule heat and is removed from a conductor 2b.

After removal of the insulator 2a, as shown in FIG. 11C, the current I flows across the two electrodes 6 and 8 by way of the conductor (typically, copper) 2b of the insulated wire 2. A pressing force F is continuously applied across the two electrodes 6 and 8 during the current-supplying period, and hence the Joule heat cooperates with the pressing force F to jointly pressure-join and crush the hooked portion 4a and the insulated wire conductor 2b together for caulking. This allows the insulated wire 2 and the terminal 4 to be firmly electrically and physically joined together. Due to an extremely small resistance of the conductor 2b of the insulated wire 2 and the terminal 4, no nugget (weld joint) will be formed therebetween.

FIG. 12 shows the circuit configuration of a single-phase AC power supply apparatus which has hitherto been used for the above fusing process. FIG. 13 shows waveforms of a voltage and current appearing in this power supply apparatus.

In this power supply apparatus, a single-phase AC voltage V of a commercial frequency input to input terminals 100 and 102 are fed to a primary coil of a step-down transformer 108 via a contactor composed of a pair of thyristors 104 and 106. An AC induced electromotive force (secondary voltage) generated in the secondary coil of the transformer 108 is applied via the secondary conductor and the electrodes 6 and 8 are applied to the workpieces W (2, 4) so that a secondary current $i_2$ having a larger current value than a primary current $i_1$ flows as the fusing current I through the secondary circuit.

Although the magnitude (effective value) of the fusing current I ($i_2$) is determined by the conduction angle, it may also be said that the magnitude depends on the firing angle due to a substantially constant relationship between the firing angle and the conduction angle. In this power supply apparatus, a control unit 110 controls the firing angle (firing timing) θ of the thyristors 104 and 106 by way of a firing circuit 112, to thereby control the effective value of the fusing current I ($i_2$).

The control unit 110 accepts a start signal from an external device (not shown) such as a conveyor robot associated with the workpieces W (2, 4), causes the pressure device to commence its pressing operation, executes the above thyristor firing control over a preset current-supplying time after the elapse of a predetermined time (squeeze time), and upon the termination of the current-supplying time, allows the pressure device to release the pressure after the elapse of a predetermined time (hold time).

In the above fusing process, the workpieces W (2, 4) are thermocompressively joined by the Joule heat and the pressing force. However, excessive thermocompressive joining may remarkably impair the shape of the joined parts or may possibly induce breakage thereof or damage thereto. A monitoring device is thus provided for detecting the displacement of the upper electrode 6 in the pressing direction to monitor the degree of thermocompressive joining of the workpieces W (2, 4). Once the displacement of the upper electrode 6 reaches a predetermined value (limit value), the monitoring device issues a current-halting signal, in response to which the control unit 110 brings the supply of current to a halt.

However, since the prior art employs the above thyristor firing control method, its current control ability may be lost after firing or turning on the thyristors 104 and 106 as shown in FIG. 14, so that the supply of current cannot be halted until the termination of that half cycle (10 ms in case of 50 Hz). For the duration, the thermocompressive joining of the workpieces W (2, 4) may proceed excessively and render the time lag in halting the supply of current fatal.

SUMMARY OF THE INVENTION

The present invention was conceived in view of the above problems. It is therefore an object of the present invention to provide a metallic members joining method and reflow soldering method in which supply of current (regular supply of current) is ceased at once even in mid course of the AC waveform when situations to halt the supply of current occur prior to the termination of the set current-supplying time in the joining or reflow soldering of the metallic members using the AC waveform current, thereby enabling good quality workpieces work qualities to be obtained.

Another object of the present invention is to provide a metallic members joining method and reflow soldering method in which the regular supply of current is interrupted the instant that a halt signal is received during the supply of current and in which a small electric current of such a magnitude as not to substantially affect the joining and soldering flows is provided depending on the state of supply of current (elapsed time and polarity) upon the receipt of the halt signal, thereby preventing the transformer from undergoing the polarized magnetism or magnetic saturation, to consequently assure the protection or reliability of the power supply unit.

In order to achieve the above objects, according to a first aspect of the present invention there is provided a metallic members joining method in which a pair of electrodes are pressed against metallic members while simultaneously an AC waveform current flows through the pair of electrodes, the metallic members being joined together by making use of Joule heat generated in the metallic members. The method comprises: converting an AC voltage of a commercial frequency by a rectifying circuit into a DC voltage; converting the DC voltage output from the rectifying circuit by an inverter into a pulsed voltage of a high frequency; applying the high-frequency pulsed voltage output from the inverter across a transformer and via the pair of electrodes to the metallic members without rectification on the secondary side of the transformer; segmenting a current-supplying time for a single joining into a plurality of unit current-supplying periods and switching the inverter at the high frequency so as to allow an AC waveform current having a set current value to flow through the secondary side of the transformer with one polarity in each odd-numbered unit current-supplying period but with the other polarity in each even-numbered unit current-supplying period; and when predetermined phenomena or predetermined conditions to halt the regular supply of current occur or are satisfied during the current-supplying time, bringing switching operations of the inverter to a halt to interrupt a regular supply of current.

According to a second aspect of the present invention there is provided a reflow soldering method in which with a solder intervening between sites to be soldered of metallic members, a resistance heating heater tip is abutted against the metallic members while simultaneously an AC waveform current flows through the heater tip, the sites to be soldered of the metallic members being soldered by making use of Joule heat generated in the heater tip. The method comprises: converting an AC voltage of a commercial frequency by a rectifying circuit into a DC voltage; converting the DC voltage output from the rectifying circuit by an inverter into a pulsed voltage of a high frequency; applying the high-frequency pulsed voltage output from the inverter across a transformer to the heater tip without rectification on the secondary side of the transformer; segmenting a current-supplying time for a single soldering into a plurality of unit current-supplying periods and switching the inverter at the high frequency so as to allow an AC waveform current having a set current value to flow through the secondary side of the transformer with one polarity in each odd-numbered unit current-supplying period but with the other polarity in each even-numbered unit current-supplying period; and the instant that predetermined phenomena or predetermined conditions to halt the regular supply of current occur or are satisfied during the current-supplying time, bringing switching operations of the inverter to a halt to interrupt a regular supply of current.

In the present invention, the inverter disposed on the primary side of the transformer is switching controlled at a high frequency and the polarity of the inverter, i.e., the polarity of the electric current is inverted at a predetermined cycle so that an AC waveform electric current flows through the secondary side and that the metallic members are joined or reflow soldered by use of this AC waveform electric current. Since the inverter performs its switching operations at the above high frequency, an instantaneous halt of the supply of current can be achieved with a time lag of one cycle at most. Thus, even when the secondary current is in mid course of the AC waveform, it is possible to interrupt and terminate the regular supply of current at any point in time.

Preferably, the methods of the present invention may further comprise the step of providing a switching control of the inverter so as to allow an electric current for erasing residual magnetism to flow through the secondary side of the transformer depending on the elapsed time and polarity in the unit current-supplying period upon the halt of supply of current. In this event, it is preferred that the electric current for erasing residual magnetism have such a current value as not to substantially affect joining of the metallic members.

BRIEF DESCRIPTION OF THE DRAWINGS

The above and other objects, aspects, features and advantages of the present invention will become more apparent from the following detailed description when taken in conjunction with the accompanying drawings, in which:

FIG. 4 is a waveform diagram at each part showing the inverter control method of this embodiment;

FIG. 6 is a diagram showing waveforms at the parts in a case where the halting of supply of current is carried out in the embodiment (first case);

FIG. 8 shows an AC waveform with a gradually decreasing current value of a small electric current for residual magnetism erasure;

DESCRIPTION OF THE PREFERRED EMBODIMENTS

The present invention will now be described with reference to FIGS. 1 to 10 which illustrate presently preferred embodiments thereof in a non-limitative manner.

Figure 1:
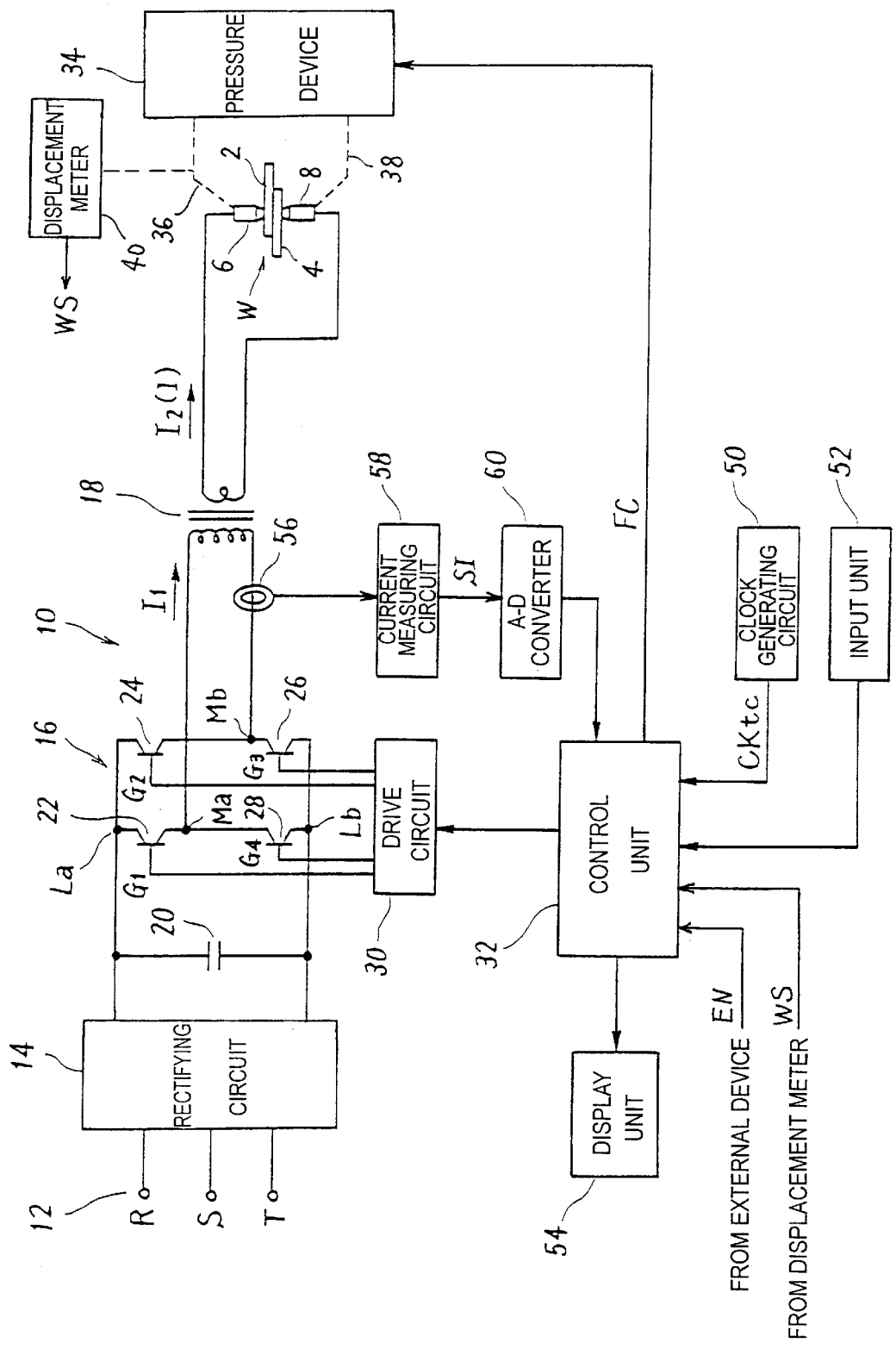
FIG. 1 is a block diagram showing the configuration of an AC waveform inverter power supply apparatus for fusing or resistance welding in accordance with an embodiment of the present invention.

FIG. 1 depicts the configuration of an AC waveform inverter power supply apparatus for a fusing process in accordance with an embodiment of the present invention.

The power supply apparatus comprises a power supply unit which is generally designated at 10. The power supply unit 10 includes a three-phase rectifying circuit 14, an inverter 16 and a step-down transformer 18. The three-phase rectifying circuit 14 consists of a plurality of, e.g., six diodes which are three-phase bridge connected with each other. The three-phase rectifying circuit 14 full-wave rectifies a three-phase AC voltage (R, S, T) of a commercial frequency input from a three-phase AC power supply terminal 12, into a DC voltage. The DC voltage output from the three-phase rectifying circuit 14 is smoothed by a capacitor 20 and fed to input terminals La and Lb of the inverter 16.

The inverter 16 has four transistor switching elements 22, 24, 26 and 28 in the form of e.g., GTRs (giant transistors) or IGBTs (insulated gate bipolar transistors).

Of the four switching elements 22 to 28, a first set of (positive side) switching elements 22 and 26 are switching controlled simultaneously at a predetermined inverter frequency (e.g., 1 kHz) by in-phase inverter control signals $G_1$ and $G_3$ from a control unit 32 by way of a drive circuit 30, whilst a second set of (negative side) switching elements 24 and 28 are switching controlled simultaneously at the above inverter frequency by in-phase inverter control signals $G_2$ and $G_4$ from the controller 32 by way of the drive circuit 30.

The inverter 16 has output terminals [Ma, Mb] that are electrically connected to opposite ends, respectively, of a primary coil of the transformer 18. A pair of electrodes 6 and 8, e.g., corresponding to those of FIG. 11 are electrically connected via only a secondary conductor to opposite ends, respectively, of a secondary coil of the transformer 18 without intervention of any rectifying circuit.

The electrodes 6 and 8 are made of a copper alloy or a metal having a high resistance value such as molybdenum or tungsten and are detachably fitted to upper and lower electrode support members 36 and 38, respectively, of a pressure device 34. The pressure device 34 incorporates a pressure drive unit (not shown) having an air cylinder for example. In response to a pressure control signal FC from the control unit 32, the pressure device 34 drives the upper electrode support member 36 for example so as to press the upper electrode 6 against workpieces W (2, 4) placed on the lower electrode 8, for pressing from above.

In this embodiment, a displacement meter 40 is provided as a monitor for monitoring the degree of depression of the workpieces W (2, 4) in the fusing process. The displacement meter 40 includes a position sensor for detecting a displacement in the height direction of the upper electrode support member 36 or the upper electrode 6. The displacement meter 40 is formed to monitor the amount of perpendicularly downward displacement of the upper electrode 6 from a reference position at the start of the current-supplying time and generate a current-halting signal WS when the amount of displacement reaches a set value. The current-halting signal WS from the displacement meter 40 is fed to the control unit 32.

The control unit 32 is formed of a microcomputer that comprises a CPU, a ROM (program memory), a RAM (data memory), an interface circuit, etc. The control unit 32 provides all controls within the power supply apparatus that include current-supplying control (esp., inverter control) and various processing conditions setting and display processing, etc. The control unit 32 interchanges required signals with the pressure device 34, the displacement meter 40 and other associated external devices. A clock-generating circuit 50 gives the control unit 32 a clock signal CKtc defining a basic or unit cycle tc for switching control of the inverter 16.

An input unit 52 includes a keyboard or key switches disposed on a console panel (not shown) of the power supply apparatus and is used for setting and input of the various conditions. A display unit 54 includes a display, e.g., a liquid crystal display disposed on the console panel, and provides a display of various conditions set values and measured values under the control of the control unit 32.

To effect a current feedback in the current-supplying control, the power supply apparatus comprises a current sensor 56 in the form of e.g., a current transformer that is fitted to a conductor of the primary circuit (or the secondary circuit) of the power supply unit 10. From an output signal of the current sensor 56, a current measuring circuit 58 acquires a measured value (e.g., effective value, average value or peak value) of a primary current $I_1$ or a secondary current $I_2$ as an analog current measurement signal SI, which signal SI in turn is converted by an A-D converter 60 into a digital signal for inputting to the control unit 32.

Figure 2:
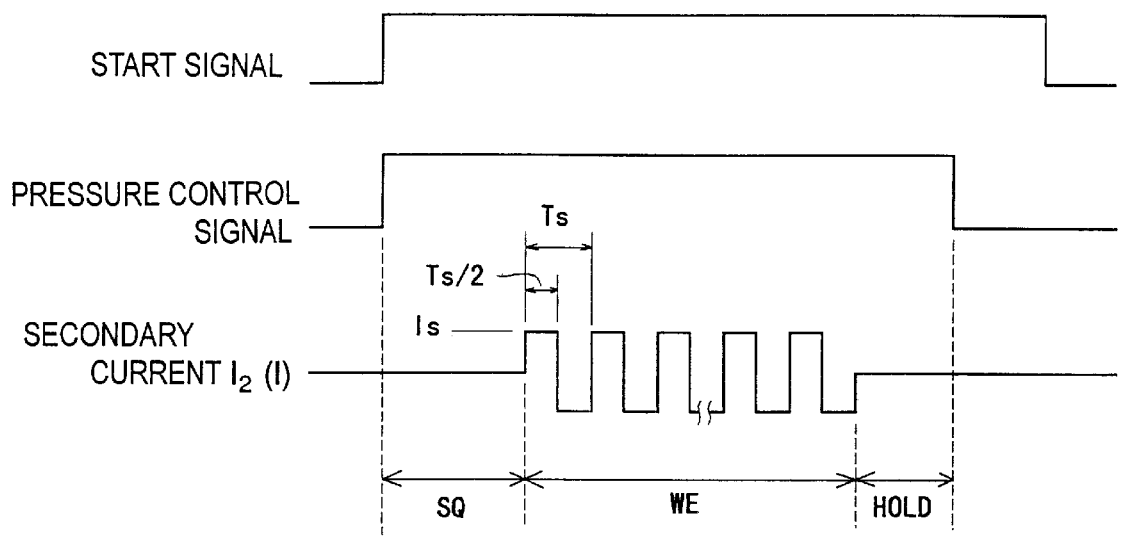
FIG. 2 is a diagram showing timings and waveforms of a single process sequence implemented by the power supply apparatus of the embodiment.

FIG. 2 depicts timings and waveforms of a single fusing process sequence that are set by use of the control unit 32, the input unit 52 and the display unit 54 of the power supply apparatus. Major parameters defining the single fusing process sequence are a squeeze time SQ, a current-supplying time WE, a hold time HOLD and a current value Is (peak value in the shown example). The current-supplying time WE is set to a value equal to integral multiples (normally, even-numbered multiples) of a unit current-supplying period Ts/2 that corresponds to a half cycle of a secondary AC frequency. The secondary AC frequency preferably conforms to a rated frequency of the transformer 18 and is normally set to a value equal to or near the commercial frequency.

Operative functions of this embodiment will now be described in the case of a fusing process of FIG. 11 by way of example.

Figure 11A:
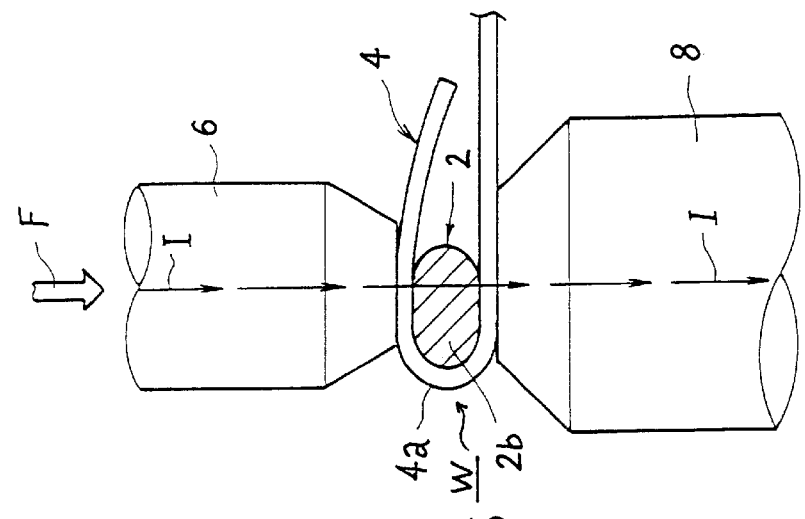
FIGS. 11A to 11C are diagrams showing an example of a fusing process.
Figure 11B:
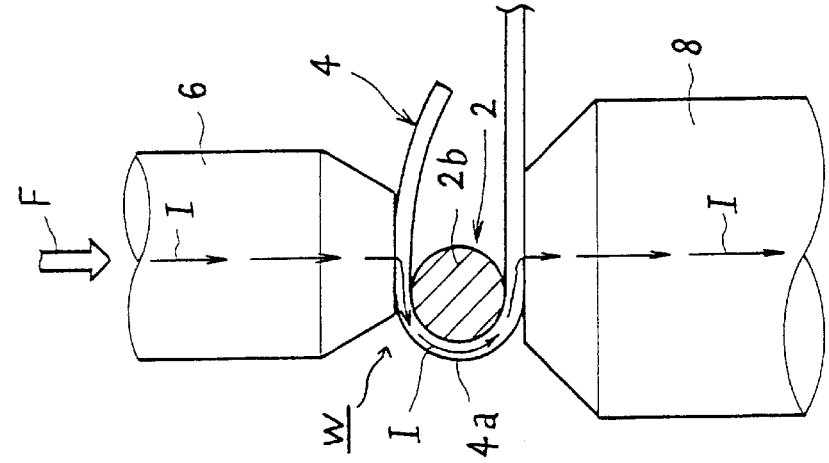

In this embodiment as well, as shown in FIG. 11A, the workpieces W consisting of the terminal 4 and the insulated wire 2 placed inside the hooked portion 4a of the terminal 4 is interposed between the upper electrode 6 and the lower electrode 8 such that the underside of the hooked portion 4a is supported in position by the lower electrode 8. After completion of interposition of the workpieces W, a predetermined external device imparts an activation signal EN (high) to the control unit 32.

In response to input of the start signal EN (H-level), the control unit 32 provides a control of each part at the sequence timing as depicted in FIG. 2. The control unit 32 first renders the pressure control signal FC active (high) to thereby cause the pressure device 34 to start its pressing action. The pressure device 34 lowers the upper electrode support member 36 so that the upper electrode 6 is pressed against workpieces W (2, 4) placed on the lower electrode 8. The power supply unit 10 initiates a normal or regular application of current for the current-applying time WE at a predetermined timing after the pressing force reaches a predetermined value, that is, after the elapse of the squeeze time SQ from the start of the pressing action.

Figure 3:
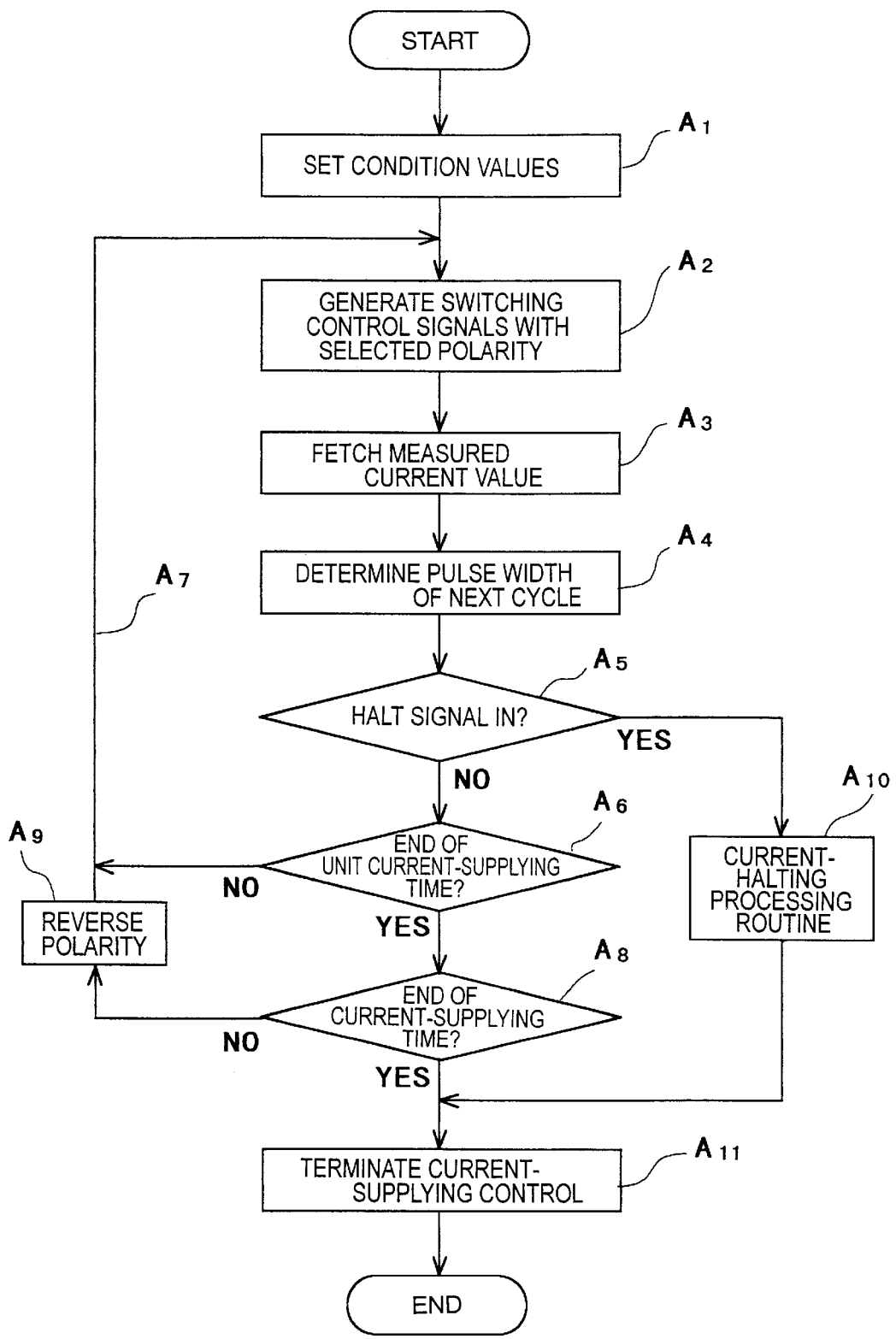
FIG. 3 is a flowchart showing a process effected by a control unit for current-supplying control in this embodiment.

FIG. 3 depicts the procedure of a current-supplying control effected by the control unit 32 in this embodiment.

First, the control unit 32 sets into respective predetermined registers desired conditions set values associated with the supply of current for that current-supplying time WE, e.g., the current-supplying time WE, the current set value Is, a set cycle number Ns, the unit current-supplying period, etc. (Step $A_1$). This current-supplying initialization may include setting of the inverter polarity in a first unit current-supplying period or setting of initial values such as the pulse width of a first high-frequency pulse in each unit current-supplying period.

The control unit 32 then selects a predetermined polarity, e.g., the positive polarity in the first unit current-supplying period Ts/2, and supplies switching control signals $G_1$ and $G_3$ having an initial pulse width via the drive circuit 30 to the positive (first set of) switching elements 22 and 26 of the inverter 16, to turn on the switching elements 22 and 26 (Step $A_2$). The negative (second set of) switching elements 24 and 28 remain OFF.

When a fusing current I (secondary current $I_2$) and a primary current $I_1$ flow through the secondary circuit and the primary circuit, respectively, of the transformer 18 in the first switching cycle, the current sensor 56 issues a current detection signal indicative of an instantaneous value of the primary current $I_1$, so that the current measuring circuit 58 outputs a current measured value (effective value, average value or peak value) SI of the primary current $I_1$ or the secondary current $I_2$ in this switching cycle.

The control unit 32 receives the current measured value SI from the current measuring circuit 58 by way of the A-D converter 60 (Step $A_3$), compares the current measured value SI with the current set value Is and, on the basis of the comparison error, determines the pulse width (switching-ON time) tp in the next switching cycle (Step $A_4$).

Then, in the second switching cycle, the control unit 32 supplies switching signals $G_1$ and $G_3$ having a pulse width tp to the positive switching elements 22 and 26, respectively, of the inverter 16 to turn on the switching elements 22 and 26 (Steps $A_7$ and $A_2$).

Thus, during the first unit current-supplying period Ts/2, only the positive switching elements 22 and 26 of the inverter 16 are subjected to continuous switching operations at a high frequency (1 kHz) under the feedback pulse-width control (Steps $A_2$ to $A_7$). For the duration, the negative switching elements 24 and 28 remain OFF. This allows the secondary current $I_2$ (fusing current I) having a substantially trapezoidal waveform that has been constant-current controlled so as to substantially coincide with the current set value Is to flow through the secondary circuit of the transformer 18 in the positive direction (FIG. 4).

Upon termination of the first unit current-supplying period (Ts/2), the control unit 32 reverses a polarity flag of the inverter to the negative side (Steps $A_8$ and $A_9$), allowing the process to proceed to the control of a second unit current-supplying period Ts/2 (Step $A_7$).

In the second unit current-supplying period Ts/2, only the negative switching elements 24 and 28 of the inverter 16 are subjected to continuous switching operations at a high frequency (1 kHz) under the feedback pulse-width control while keeping the positive switching elements 22 and 26 in the OFF state (Steps $A_2$ to $A_7$). This allows the secondary current $I_2$ (fusing current I) having a substantially trapezoidal waveform that has been constant-current controlled so as to substantially coincide with the current set value Is to flow through the secondary circuit of the transformer 18 in the negative direction (FIG. 4).

Thus, in each odd-numbered unit current-supplying period of an even number of unit current-supplying periods Ts/2 making up the total current-supplying time WE, the control unit 32 subjects only the positive switching elements 22 and 26 to the continuous switching operations while keeping the negative switching elements 24 and 28 in the OFF state, whereas in each even-numbered unit current-supplying period it subjects only the negative switching elements 24 and 28 to the continuous switching operations while keeping the positive switching elements 22 and 26 OFF. This allows the secondary current $I_2$, i.e., fusing current I having substantially a trapezoidal current waveform to flow through the secondary circuit of the power supply apparatus in the positive direction for each odd-numbered unit current-supplying period Ts/2 but in the negative direction for each even-numbered unit current-supplying period Ts/2.

In this manner, between the electrodes 6 and 8 there flows a fusing current I having a substantially trapezoidal current waveform in each unit current-supplying period Ts/2, whereby sufficient thermal energy can be fed to the workpieces W even at a relatively low current peak value Is with a high heat generation efficiency. For this reason, it is possible to generate Joule heat sufficient to fuse an insulator 2a of the insulated wire 2 while preventing heat shock at the workpieces W, esp., at the terminal hooked portion 4a.

Figure 11C:
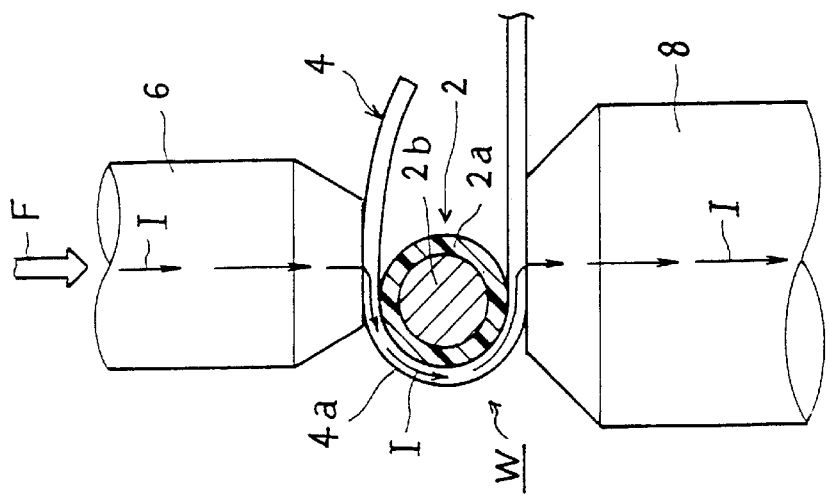
Figure 12:
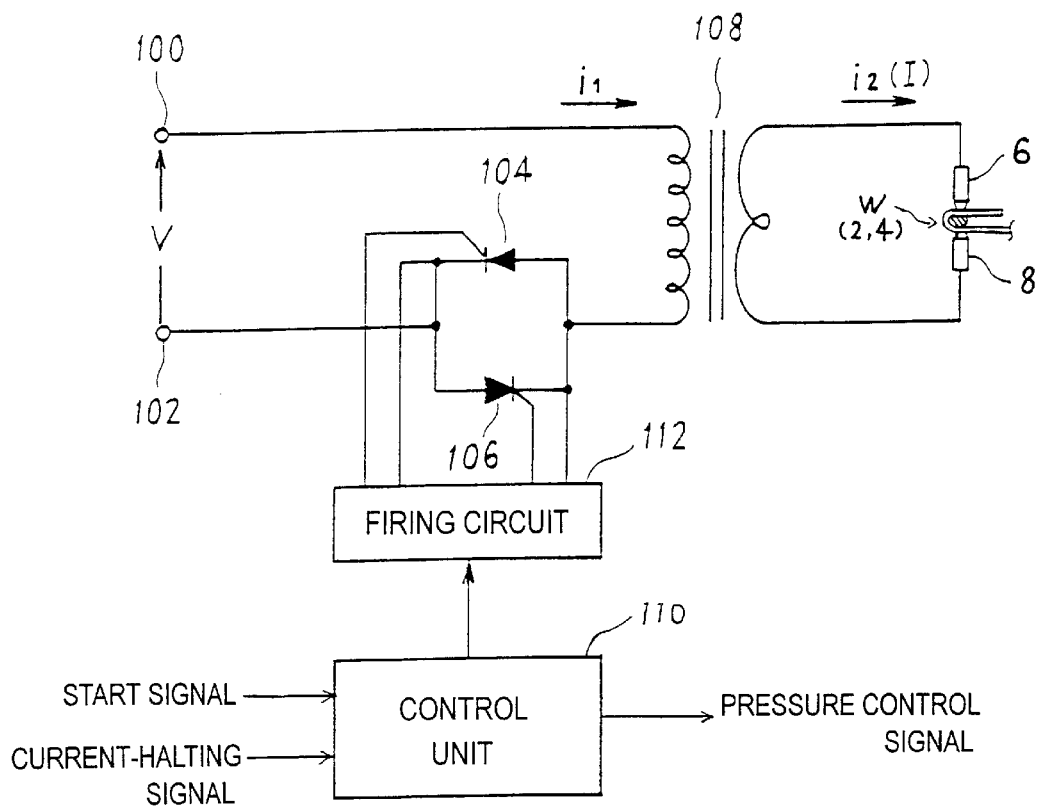
FIG. 12 is a block diagram showing a circuit configuration of a single-phase AC power supply apparatus for use in a conventional fusing process.
Figure 13:
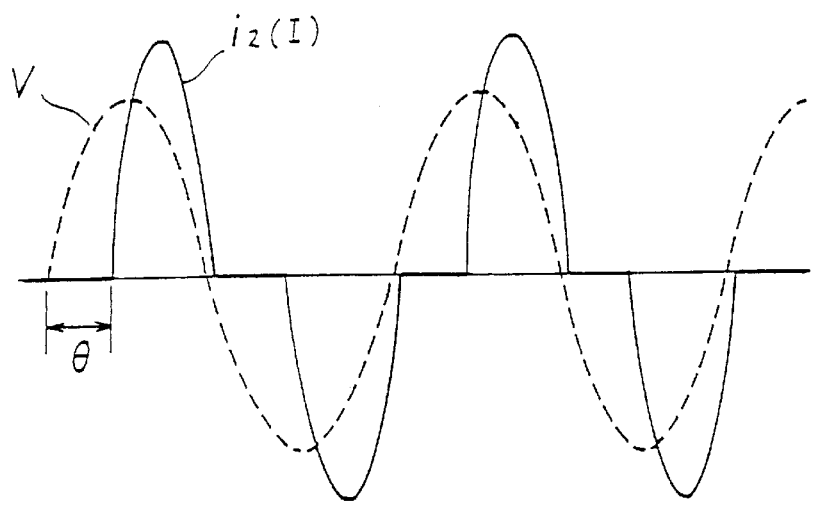
FIG. 13 is a waveform diagram showing waveforms of voltage and current in a conventional single-phase AC power supply apparatus.
Figure 14:
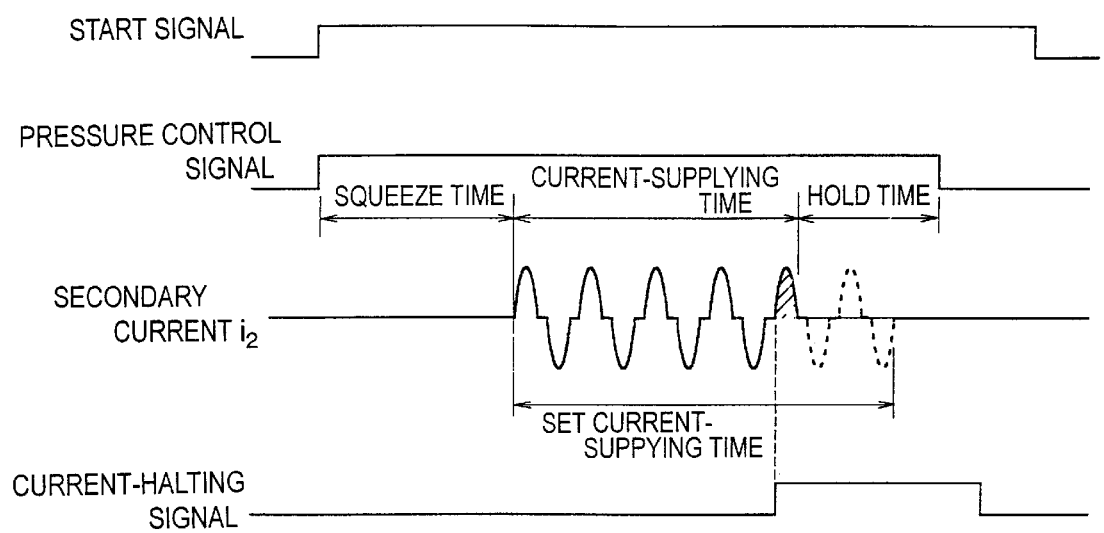
FIG. 14 is a waveform diagram showing a deficiency which may appear upon a halting of the supply of current in a conventional fusing method.

In this embodiment as well, after removal of the insulator 2a, the current I flows through a conductor 2b of the insulated wire 2 between the two electrodes 6 and 8 as depicted in FIG. 11C so that Joule heat is generated by both the terminal 4 and the insulated wire 2. This Joule heat cooperates with the pressing force from the pressure device 34 to jointly pressure-join and crush the hooked portion 4a and the insulated wire conductor 2b together for caulking.

The control unit 32 completely stops the inverter 16 upon the elapse of the current-supplying time WE to bring all the current-supplying control to a termination (Step $A_{11}$). Then, after the elapse of the hold time HOLD, the control unit 32 causes the pressure device 34 to release its pressing force F.

In the above fusing process, however, the displacement meter 40 issues a current-halting signal WS (high) once the amount of depression of the workpieces W reaches a predetermined value in the course of the normal supply of current in the current-supplying time WE. Upon receipt of the current-halting signal WS in the midst of the above switching control for the inverter 16, the control unit 32 does not proceed to the next switching cycle (Step $A_5$) but instead enters a current halting processing routine (Step $A_{10}$).

Figure 5:
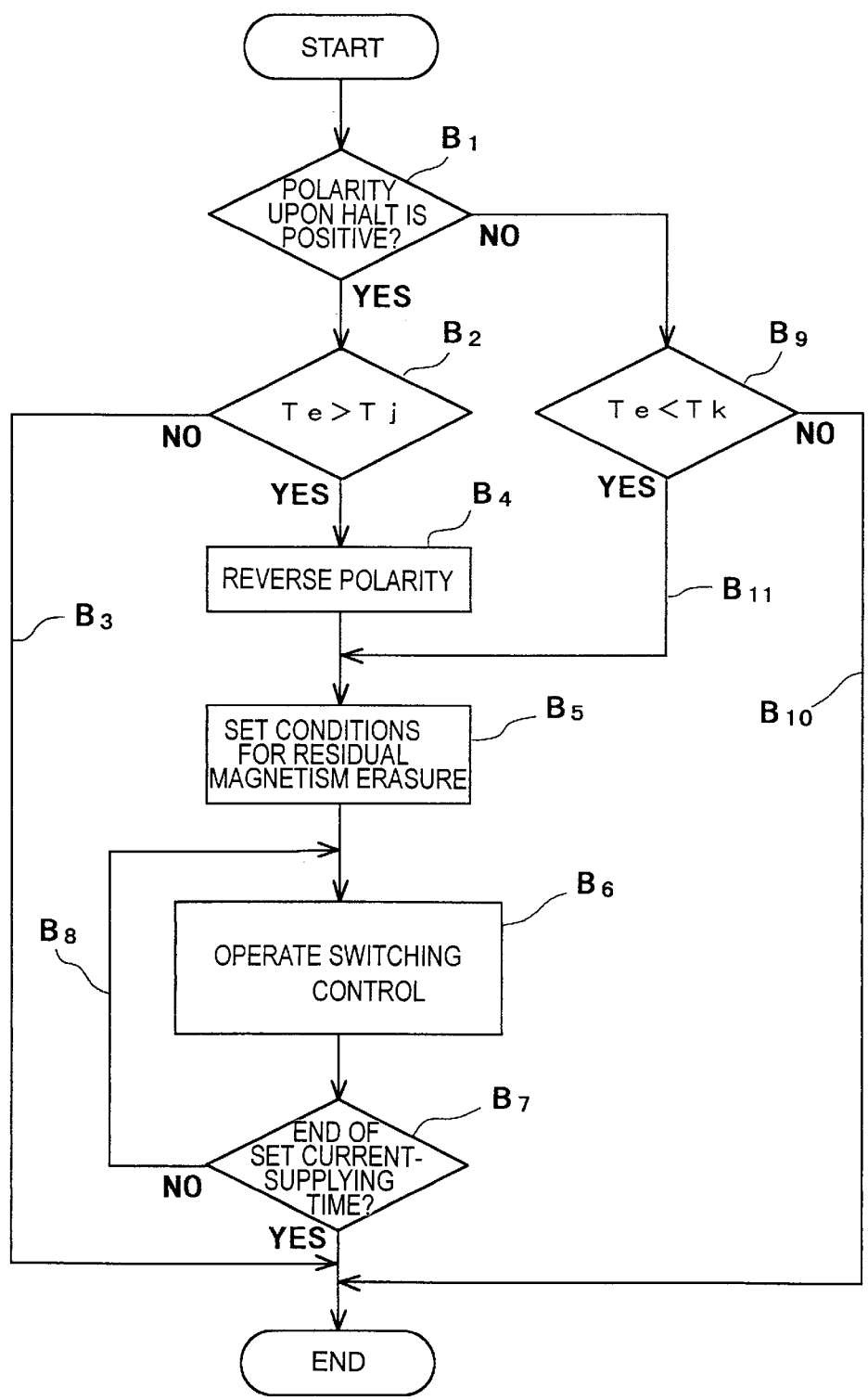
FIG. 5 is a flowchart showing the procedure for halting supply of current included in the current-supplying control of the embodiment.

FIG. 5 depicts the procedure of the current-halting processing (Step $A_{10}$) effected by the control unit 32 in this embodiment. In addition to the halt of the switching operations of the inverter 16, the control unit 32 of this embodiment allows a flow of a small electric current $i_m$ for erasing the residual magnetism of the transformer 18 immediately after the halt of the normal supply of current or the regular supply of current conditionally depending on the circumstances upon the halt of current.

The control unit 32 first judges the polarity of the inverter 16 or the polarity of the current I upon the receipt of the current-halting signal WS (Step $B_1$). If positive, i.e., if the polarity upon the halt of current conforms to the polarity upon the start of current, then the control unit 32 effects the following processing or control.

The control unit 32 judges whether the elapsed time Te in the unit current-supplying period Ts/2 upon the receipt of the current-halting signal WS has exceeded a set value Tj (Step $B_2$). Herein, the set value Tj is a reference value for determining whether to cause flow of the small electric current $i_m$ for residual magnetism erasure. The set value Tj may be set for example to a value ranging from 30% to 60% of the unit current-supplying period Ts/2.

Figure 7A:
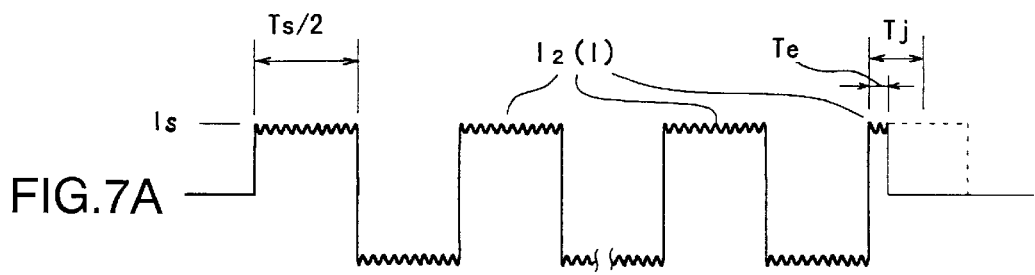
FIGS. 7A to 7C are diagrams showing waveforms at the parts in cases where the halting of supply of current is carried out in the embodiment (second to fourth cases)

If the elapsed time Te does not exceed the reference value Tj, then the control unit 32 judges that there is no need to cause flow of the small electric current $i_m$ for residual magnetism erasure, to terminate the present current-halting processing (Step $B_3$) to bring the switching operations of the inverter 16 to a complete halt (Step $A_{11}$). Since the inverter 16 performs its switching operations at a cycle of the clock CKtc, the complete halt is achieved within several clock cycles, at the latest, from the receipt of the current-halting signal. A secondary current waveform in this case is depicted in FIG. 7A.

If the elapsed time Te exceeds the reference value Tj, then the control unit 32 reverses the inverter polarity flag to the negative side (Step $B_4$) and defines a current set value $I_m$ and a current-supplying time Tm of a small electric current $i_m$ for preventing the occurrence of polarized magnetism (Step $B_5$). Then the control unit 32 again provides a switching control of the inverter 16 in conformity with the set conditions (Steps $B_6$, $B_7$ and $B_8$) and, after the elapse of the current-supplying time Tm (Step $B_7$), brings the switching operations of the inverter 16 to a complete halt (Step $A_{11}$).

FIG. 6 depicts waveforms at the parts in the case corresponding to the series of processings (Steps $B_2$ to $B_8$). The small electric current $i_m$ for residual magnetism erasure serves to prevent any residual magnetism from occurring in the transformer 18 as a result of interruption of the secondary AC waveform current $I_2$ (I) in the regular supply of current. The current set value $I_m$ of the small electric current $i_m$ may selectively be set to such a value as not to substantially affect the workpieces W (by thermal effect from Joule heat). The current-supplying time Tm of the small electric current $i_m$ is selectively set to a value that is proportional to the elapsed time Te of the unit current-supplying period Ts/2 upon the interruption of the regular supply of current.

If the polarity upon the halt of current is negative, i.e., if the polarity upon the interruption of supply of current is opposite to the polarity upon the start of current, then the control unit 32 judges whether the elapsed time Te of the unit current-supplying period Ts/2 upon the halt of current lies within a set value Tk (Step $B_9$). The set value Tk is a negative side reference value having the same meaning as the above positive side reference value Tj. The set value Tk may be set for example to a value ranging from 30% to 60% of the unit current-supplying period Ts/2.

Figure 7B:
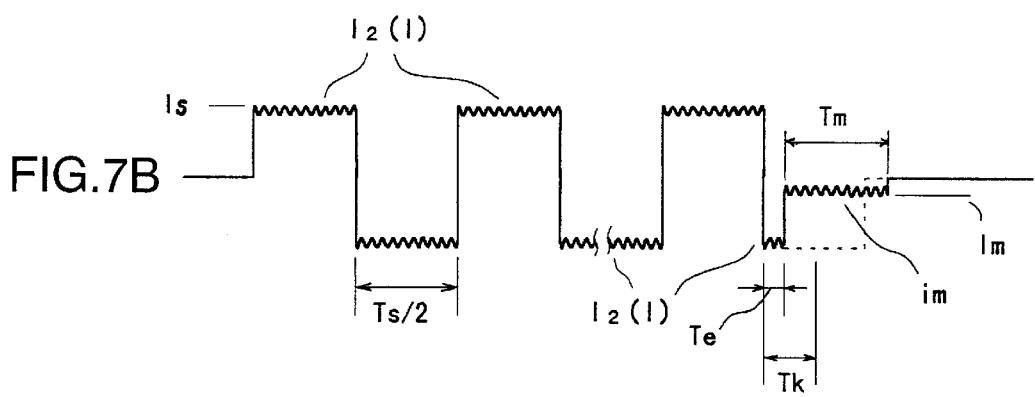
Figure 7C:
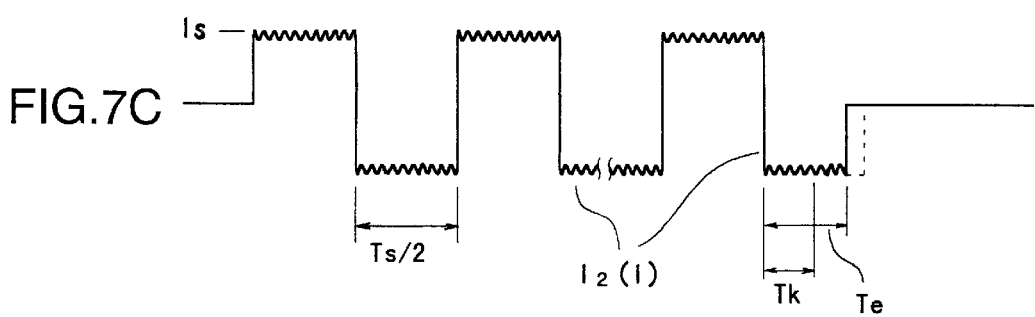

When the elapsed time Te exceeds the reference value Tk, judgment is made that there is no need to flow the small electric current $i_m$ for residual magnetism erasure, to terminate the present current halting processing (Step $B_{10}$) to bring the switching operations of the inverter 16 to a complete halt (Step $A_{11}$). A secondary current waveform in this case is depicted in FIG. 7C.

When the elapsed time Te is less than the reference value Tk, the control unit 32 defines the current set value $I_m$ and the current-supplying time Tm of the small electric current $i_m$ for residual magnetism erasure with the inverter polarity (negative) unchanged (Steps $B_{11}$, and $B_5$). In conformity with the set conditions, the control unit 32 again provides a switching control of the inverter 16 (Steps $B_6$, $B_7$ and $B_8$) and, after the elapse of the current-supplying time Tm (Step $B_7$), brings the switching operations of the inverter 16 to a complete halt (Step $A_{11}$). A secondary current waveform in this case is depicted in FIG. 7B. The current-supplying time Tm of the small electric current $i_m$ in this case is selectively set to a value that is inversely proportional to the elapsed time Te of the unit current-supplying period Ts/2 upon the halt of the regular supply of current.

Thus, in this embodiment, when the regular supply of current allowing a flow of the AC waveform current $I_2$ (I) through the secondary side is interrupted in response to a predetermined current-halting signal WS, the control unit 32 conditionally provides a switching control of the inverter 16 in conformity with the elapsed time of the unit current-supplying period Ts/2 and the polarity upon the halt of current so that a small electric current $i_m$ of a moderate magnitude flows through the secondary side for a moderate time with an appropriate polarity to thereby prevent any residual magnetism from residing in the transformer 18 after the completion of that fusing process. As a result, it is possible to prevent the polarized magnetism or magnetic saturation from occurring in the transformer 18 and to thereby safely keep the switching elements 22 to 28 of the inverter 16.

In the above embodiment, the small electric current $i_m$ for residual magnetism erasure may be of a gradually decreasing AC current as depicted in FIG. 8. In this case, a center line of an envelope of the AC current must lie in the opposite polarity side with respect to the polarity of the first current-supplying period. This AC cycle or frequency may be same as or different from that of the regular supply of current.

As another approach to prevention of the polarized magnetism or magnetic saturation which the transformer 18 may suffer, that fusing process may be terminated without performing the above current-halting processing ($A_{10}$) upon the interruption of the regular supply of current, but instead the switching control of the inverter 16 may be commenced from the negative side in the regular supply of current for the next fusing process.

The AC waveform inverter power supply apparatus of the above embodiment has been directed to the fusing process. However, this AC waveform inverter power supply apparatus is applicable intactly to resistance welding applications that allow the workpieces to be substantially displaced upon the joining, such as projection welding. In this case as well, the same operative functions and effects as the above can be obtained. It may also be applied to an application in which joint faces of the workpieces are previously plated with solder or tin so that the joint faces are soldered together by the same supply of current as the case of the resistance welding.

Figure 9:
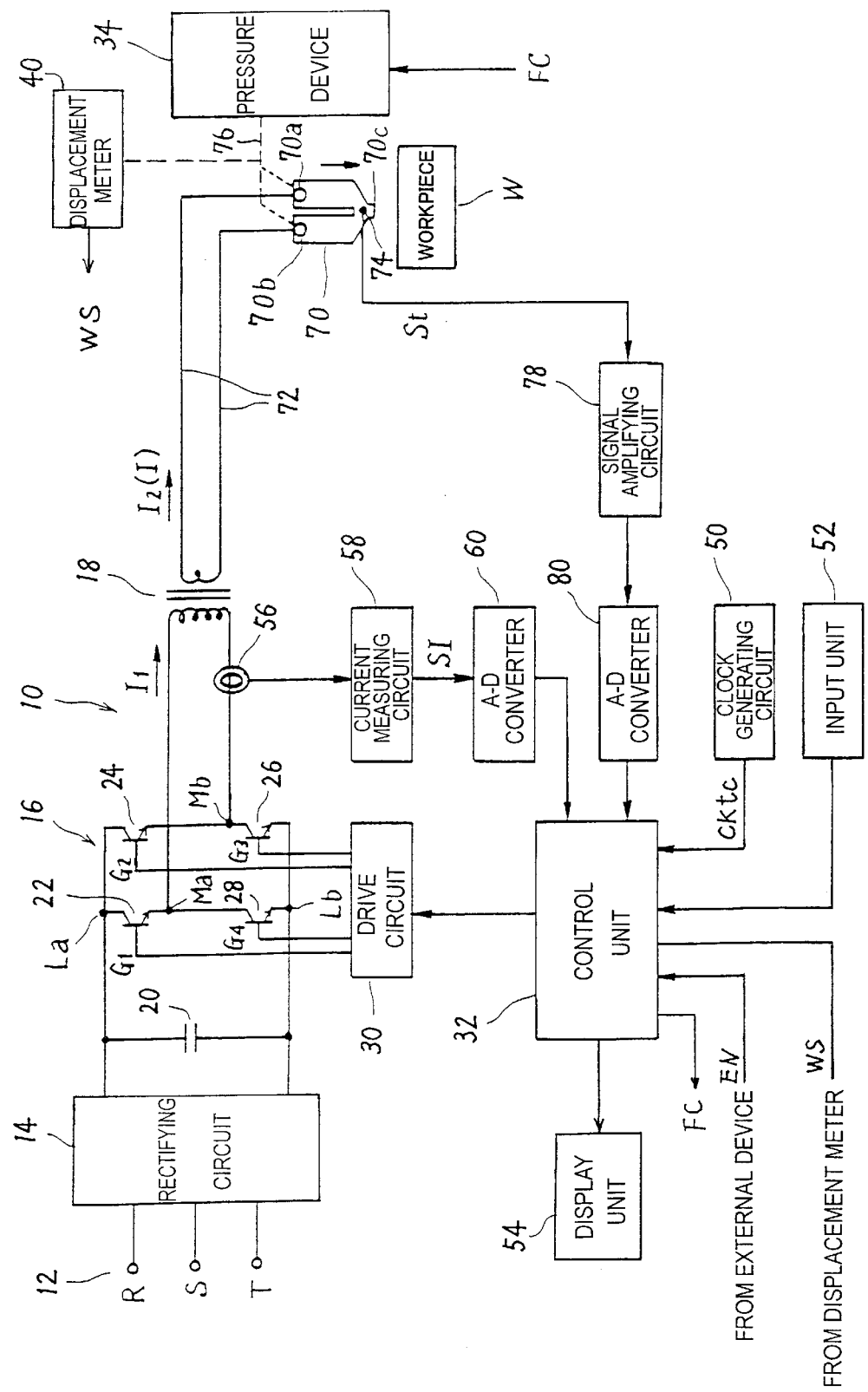
FIG. 9 is a block diagram showing the configuration of an AC waveform inverter power supply apparatus for reflow soldering in accordance with an embodiment of the present invention.

The present invention is applicable to reflow soldering. FIG. 9 depicts the configuration of an AC waveform inverter power supply apparatus for reflow soldering in accordance with another embodiment of the present invention. Like reference numerals are imparted to parts having substantially the same features and functions as those of the above power supply apparatus for fusing or resistance welding (FIG. 1).

Referring to FIG. 9, a heater tip 70 has opposed terminals 70a and 70b that are connected via only secondary conductors 72 to opposite ends, respectively, of the secondary coil of the transformer 18 without intervention of any rectifying circuit.

The heater tip 70 is made of a metallic resistor having high heat-generating properties, e.g., molybdenum and, when an electric current flows across the two terminals 70a and 70b, generates heat as a result of resistance heating. The heater tip 70 includes a point 70c which at its vicinity, e.g., its side face, is fitted with a thermocouple 74 acting as a temperature sensor. The thermocouple 74 issues an electric signal (temperature detection signal) St indicative of the temperature near the point 70c. The heater tip 70 is detachably fitted to a tip support member 76 of the pressure device 34. The pressure device 34 is arranged to drive the tip support member 76 in response to a pressure control signal FC from the control unit 32 to thereby cause the heater tip 70 to press against the workpiece W. The displacement meter 40 selves to monitor a displacement in the height direction of the tip support member 76 or the heater tip 70 and issue a current-halting signal when the amount of displacement in the reflow soldering process reaches a set value.

To provide a feedback control of the heating temperature of the heater tip 70 in this power supply apparatus, an analog temperature detection signal St from the thermocouple 74 fitted to the heater tip 70 is amplified by a signal amplifying circuit 78 and then converted by the A-D converter 80 into a digital signal, which signal in turn is fed to the control unit 32.

Similar to the above power supply apparatus for fusing or resistance welding, this power supply apparatus may also set substantially the same pressing/current-supplying sequence as in FIG. 2 by the action of the control unit 32 and effect the current-supplying control in substantially the same procedure as in FIG. 3 during the regular supply of current for the current-supplying time.

Figure 10:
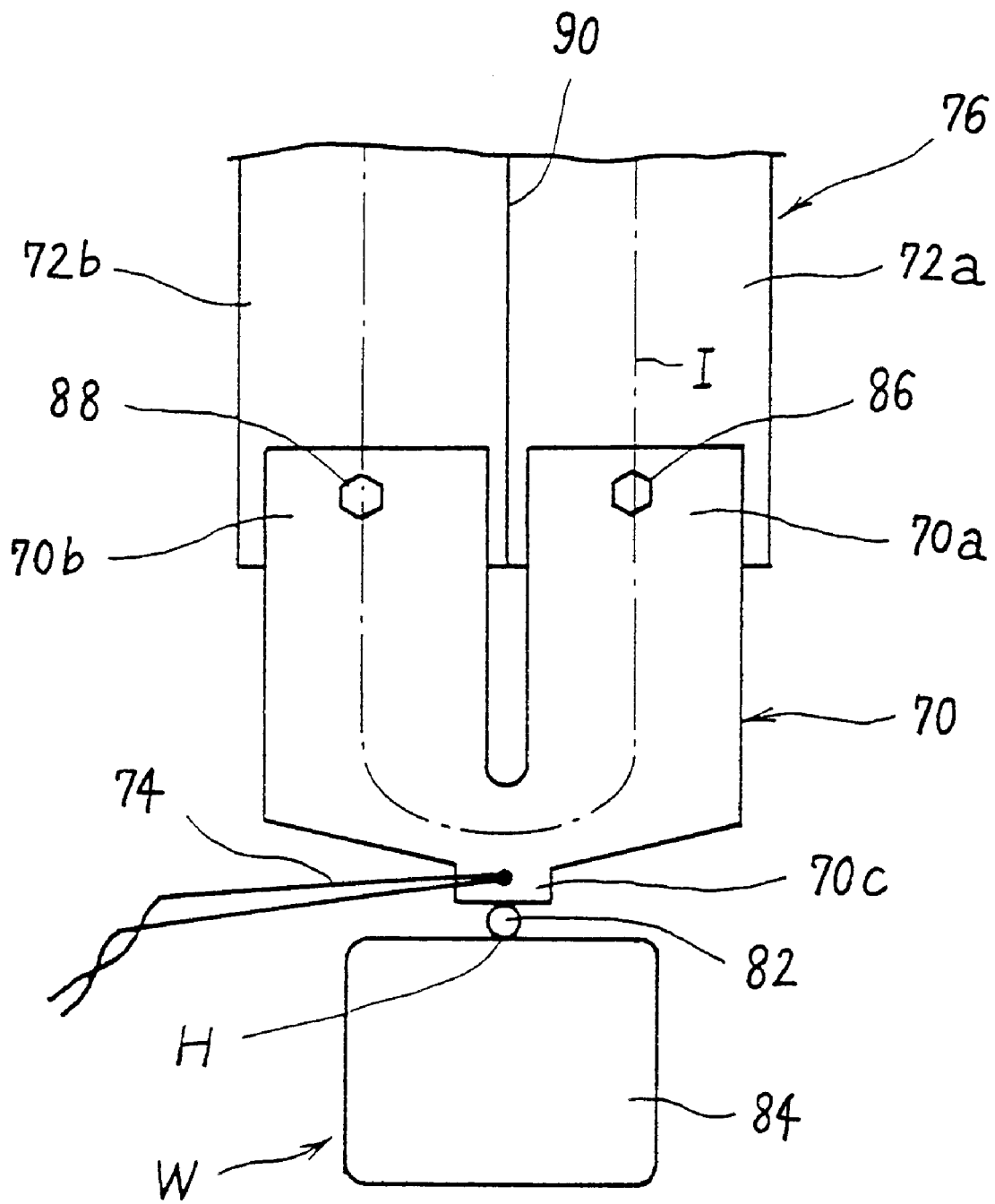
FIG. 10 is a diagram showing an example of a reflow soldering process.

During the current-supplying time, the heater tip 70 generates heat as a result of resistance heating and, by means of its point 70c, applies pressure and heat to sites H to be soldered of workpieces W (82, 84) as depicted in FIG. 10. Cream solder is applied in advance to joint faces at the sites to be soldered so that the cream solder melts under the pressure and heat from the heater tip 70. After the termination of the supply of current and subsequent release of the pressure, the solder becomes solidified and the sites H to be soldered of the workpieces W (82, 84) are physically and electrically joined together via the solidified solder.

In the example of FIG. 10, one member 82 of the workpieces W is a coil 82 and the other member 84 is a terminal. The tip support member 76 is coupled to the opposed terminals 70a and 70b of the heater tip 70 by means of bolts 86 and 88 and has a lower end made of an electrically conductive material, e.g., copper, and serving as a part of the secondary conductors 72 in the power supply unit 10. Each secondary conductor 72 is made up of electrically conductive members 72a and 72b that are electrically insulated from each other by an insulator 90.

In the event that the workpieces W, esp., the coil 82 excessively deforms and the amount of displacement of the heater tip 70 reaches a set value in the above reflow soldering process, the displacement meter 40 may issue a current-halting signal WS at that point in time so that the control unit 32 can effect the current-halting processing in substantially the same procedure as in FIG. 5 in response to the signal WS.

Although in the above embodiments the regular supply of current has been halted in response to the current-halting signal WS output from the displacement meter 40, like current-halting signals may be issued from other external devices, e.g., a voltage monitoring device, a current monitoring device or a temperature monitoring device. These monitors or detectors may be built into the power supply apparatus.

Although in the above embodiments the three-phase alternating current of the commercial frequency is converted into a direct current to be fed to the inverter 16, a single-phase alternating current of the commercial frequency may be converted into a direct current. The circuit configuration of the inverter 16 is a mere example and it may variously be modified. The current waveform in each unit current-supplying period is not limited to the trapezoidal waveform as in the above embodiments, but it may be controlled to any desired current waveform.

Although the current-supplying control in the above embodiments has employed the PWM (pulse-width modulation) method as the feedback constant-current control, other methods may be employed such as the current peak value control or limiter control method in which the current peak value conforms to the set value for each cycle of the inverter frequency.

According to the metallic member joining or reflow soldering method of the present invention, as set forth hereinabove, the regular supply of current is interrupted even in mid course of the AC waveform the instant that there occurs a situation to halt the regular supply of current prior to termination of the set current-supplying time in the joining or reflow soldering of the metallic members using the AC waveform electric current, whereby good processing qualities can be obtained. Thus, by ensuring that the transformer will not experience any polarized magnetism or magnetic saturation in spite of such a halt of the regular supply of current in mid course of the AC waveform, the protection or reliability of the power supply unit can be assured.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A metallic members joining method in which a pair of electrodes are pressed against metallic members while simultaneously an AC waveform current flows through said pair of electrodes, said metallic members being joined together by making use of Joule heat generated in said metallic members, said method comprising:

converting an AC voltage of a commercial frequency by a rectifying circuit into a DC voltage;

converting said DC voltage output from said rectifying circuit by an inverter into a pulsed voltage of a high frequency;

applying said high-frequency pulsed voltage output from said inverter across a transformer and via said pair of electrodes to said metallic members without rectification on a secondary side of said transformer;

segmenting a current-supplying time for a single joining into a plurality of unit current-supplying periods and switching said inverter at said high frequency so as to allow an AC waveform current having a set current value to flow through the secondary side of said transformer with one polarity in each odd-numbered unit current-supplying period but with the other polarity in each even-numbered unit current-supplying period;

when predetermined phenomena or predetermined conditions to halt a regular supply of current occur or are satisfied during said current-supplying time, bringing switching operations of said inverter to a halt to interrupt the regular supply of current; and providing a switching control of said inverter so as to allow an electric current for erasing residual magnetism to flow through the secondary side of said transformer depending on the elapsed time and polarity in said unit current-supplying period upon said halt of supply of current.

2. A metallic members joining method according to claim 1, wherein said electric current for erasing residual magnetism has an opposite polarity to that of the regular supply of current in the halted current-supplying period when the regular supply of current in said halted current-supplying period has the same polarity as the regular supply of current in a first current-supplying period and if said halted current-supplying period has elapsed for at least a predetermined time; and wherein said electric current for erasing residual magnetism has the same polarity as the regular supply of current in said halted current-supplying period when the regular supply of current in said halted current-supplying period has the opposite polarity to the regular supply of current in said first current-supplying period and if said halted current-supplying period has not elapsed for a predetermined time.

3. A metallic members joining method according to claim 2, wherein said electric current for erasing residual magnetism has such a current value as not to substantially affect joining of said metallic members.

4. A metallic members joining method according to claim 1, wherein said electric current for erasing residual magnetism is an attenuating AC current.

5. A metallic members joining method according to claim 4, wherein said electric current for erasing residual magnetism has such a current value as not to substantially affect joining of said metallic members.

6. A reflow soldering method in which with a solder intervening between sites to be soldered of metallic members, a resistance heating heater tip is abutted against said metallic members while simultaneously an AC waveform current flows through said heater tip, said sites to be soldered of said metallic members being soldered by making use of Joule heat generated in said heater tip, said method comprising:

converting an AC voltage of a commercial frequency by a rectifying circuit into a DC voltage;

converting said DC voltage output from said rectifying circuit by an inverter into a pulsed voltage of a high frequency;

applying said high-frequency pulsed voltage output from said inverter across a transformer to said heater tip without rectification on a secondary side of said transformer;

segmenting a current-supplying time for a single soldering into a plurality of unit current-supplying periods and switching said inverter at said high frequency so as to allow an AC waveform current having a set current value to flow through the secondary side of said transformer with one polarity in each odd-numbered unit current-supplying period but with the other polarity in each even-numbered unit current-supplying period;

the instant that predetermined phenomena or predetermined conditions to halt a regular supply of current occur or are satisfied during said current-supplying time, bringing switching operations of said inverter to a halt to interrupt the regular supply of current; and providing a switching control of said inverter so as to allow an electric current for erasing residual magnetism to flow through the secondary side of said transformer depending on the elapsed time and polarity in said unit current-supplying period upon said halt of the regular supply of current.

7. A reflow soldering method according to claim 6, wherein said electric current for erasing residual magnetism has an opposite polarity to that of the regular supply of current in the halted current-supplying period when the regular supply of current in said halted current-supplying period has the same polarity as the regular supply of current in a first current-supplying period and if said halted current-supplying period has elapsed for at least a predetermined time; and wherein said electric current for erasing residual magnetism has the same polarity as the regular supply of current in said halted current-supplying period when the regular supply of current said halted current-supplying period has the opposite polarity to the regular supply of current in said first current-supplying period and if said halted current-supplying period has not elapsed for a predetermined time.

8. A reflow soldering method according to claim 7, wherein said electric current for erasing residual magnetism has such a current value as not to substantially affect soldering of said metallic members.

9. A reflow soldering method according to claim 6, wherein said electric current for erasing residual magnetism is an attenuating AC current.

10. A reflow soldering method according to claim 9, wherein said electric current for erasing residual magnetism has such a current value as not to substantially affect soldering of said metallic members.

* * * * *